(12) United States Patent
Glebe et al.

(10) Patent No.: US 8,781,918 B2
(45) Date of Patent: Jul. 15, 2014

(54) MONITORING UPDATES INVOLVING DATA STRUCTURES ACCESSED IN PARALLEL TRANSACTIONS

(75) Inventors: Thorsten Glebe, Leimen (DE); Andrei Suvernev, Palo Alto, CA (US)

(73) Assignee: SAP AG, Walldorf (DE)

( * ) Notice: Subject to any disclaimer, the term of this patent is extended or adjusted under 35 U.S.C. 154(b) by 952 days.

(21) Appl. No.: 12/332,254

(22) Filed: Dec. 10, 2008

(65) Prior Publication Data

US 2010/0145916 A1  Jun. 10, 2010

(51) Int. Cl.
*G06Q 10/00* (2012.01)
(52) U.S. Cl.
USPC ............................................ 705/28; 707/687
(58) Field of Classification Search
None
See application file for complete search history.

(56) References Cited

U.S. PATENT DOCUMENTS

| 7,818,292 B2 * | 10/2010 | Nori et al. ..................... 707/610 |
| 2002/0042910 A1 * | 4/2002 | Baumeister et al. .......... 717/172 |
| 2006/0053080 A1 * | 3/2006 | Edmonson et al. ............. 705/59 |
| 2007/0005457 A1 | 1/2007 | Suvernev et al. |
| 2008/0147724 A1 | 6/2008 | Suvernev et al. |

* cited by examiner

*Primary Examiner* — Ramsey Refai
(74) *Attorney, Agent, or Firm* — Schwegman, Lundberg & Woessner, P.A.

(57) ABSTRACT

The embodiments described herein provide techniques for monitoring updates involving data structures accessed in parallel transactions. In an example, objects may be stored in one of the data structures and such objects that may be accessed in multiple, parallel transactions. Counters are maintained in another data structure to track the stored objects. In an illustrative embodiment, this counter is based on a checksum that is derived from a sub key that uniquely identifies an object within a group of objects.

9 Claims, 10 Drawing Sheets

INSERT TQA 1: (P1, T1, 15)

DATABASE 450

| MAIN KEY 451 | SUB KEY 452 | QTY. 453 | MER. CTR. 454 | CHK SUM 455 |
|---|---|---|---|---|
| ⋮ | | | | |
| P1 / T1 | S1 | 15 | 1 | 409 |
| ⋮ | | | | |

INDEX 470

| MAIN KEY 471 | SUB KEY 472 | CTR. 473 |
|---|---|---|
| T1 | P1 | 409 |
| ⋮ | | |

*FIG. 4a*

INSERT TQA 2: (P1, T1, 20)

DATABASE 450

| MAIN KEY 451 | SUB KEY 452 | QTY. 453 | MER. CTR. 454 | CHK SUM 455 | SUB KEY 456 | QTY. 457 | MER. CTR. 458 | CHK SUM 459 | |
|---|---|---|---|---|---|---|---|---|---|
| ⋮ | | | | | | | | | |
| P1/ T1 | S1 | 15 | 1 | 409 | S2 | 20 | 1 | 103 | |
| ⋮ | | | | | | | | | |

INDEX 470

| MAIN KEY 471 | SUB KEY 472 | CTR. 473 |
|---|---|---|
| T1 | P1 | 512 |
| ⋮ | | |

*FIG. 4b*

PARALLEL DELETIONS:
TQA 2: (P1, T1, 20)
TQA 2: (P1, T1, 20)

DATABASE 450

| MAIN KEY 451 | SUB KEY 452 | QTY. 453 | MER. CTR. 454 | CHK SUM 455 | SUB KEY 456 | QTY. 457 | MER. CTR. 458 | CHK SUM 459 |
|---|---|---|---|---|---|---|---|---|
| ⋮ | | | | | | | | |
| P1/ T1 | S1 | 15 | 1 | 409 | S2 | -20 | -1 | 103 |
| ⋮ | | | | | | | | |

INDEX 470

| MAIN KEY 471 | SUB KEY 472 | CTR. 473 |
|---|---|---|
| T1 | P1 | 306 |
| ⋮ | | |

*FIG. 4c*

MONITORING UPDATES INVOLVING DATA STRUCTURES ACCESSED IN PARALLEL TRANSACTIONS

FIELD

The present disclosure relates generally to information management. In an embodiment, the disclosure relates to monitoring updates involving data structures accessed in parallel transactions.

BACKGROUND

A database typically organizes data using primary keys. Generally, primary keys are used to uniquely identify records in a database, and because primary keys may occupy a significant number of bytes, a large amount of memory is needed to store primary keys.

To illustrate the foregoing, a modern supply chain management system may receive an order and determine whether goods are available for delivery as requested by the order. To avoid committing the same goods to multiple orders received in parallel transactions, the goods are temporarily reserved until the transaction in which the order is stored or canceled has ended. Such a reservation is referred to as a temporary quantity assignment (TQA). Within a transaction, multiple orders might be created. Each order might request goods in multiple product locations.

TQAs of different transactions may be stored persistently in a database container according to a product location identifier associated with a requested good and a transaction identifier identifying a transaction. The product location identifier and the transaction identifier may comprise the primary key of each TQA. To delete all TQAs associated with a given transaction once the order is stored or canceled, the TQAs are first identified using primary keys associated with the product locations of the order goods. Construction of the primary keys may be facilitated by a stored administration data structure associating each transaction identifier (or, alternatively, each order identifier) with its associated product location identifier.

BRIEF DESCRIPTION OF DRAWINGS

The present disclosure is illustrated by way of example and not limitation in the figures of the accompanying drawings, in which like references indicate similar elements and in which:

FIGS. 4a, 4b, and 4c depict diagrams illustrating the monitoring of updates in a database with an index, in accordance with an illustrative embodiment, by tracking objects in the form of temporary quantity assignments (TQAs).

DETAILED DESCRIPTION

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide techniques for monitoring updates involving data structures that are accessed in parallel transactions. In an example, objects may be stored in one of the data structures and such objects that may be accessed in multiple, parallel transactions. Counters are maintained in another data structure to track the stored objects. In an illustrative embodiment, as explained in more detail below, this counter is a checksum that is derived from a sub key that uniquely identifies each object within a group of objects. This counter can be used to monitor updates in at least one of the data structures without utilizing database locks.

Figure 1:
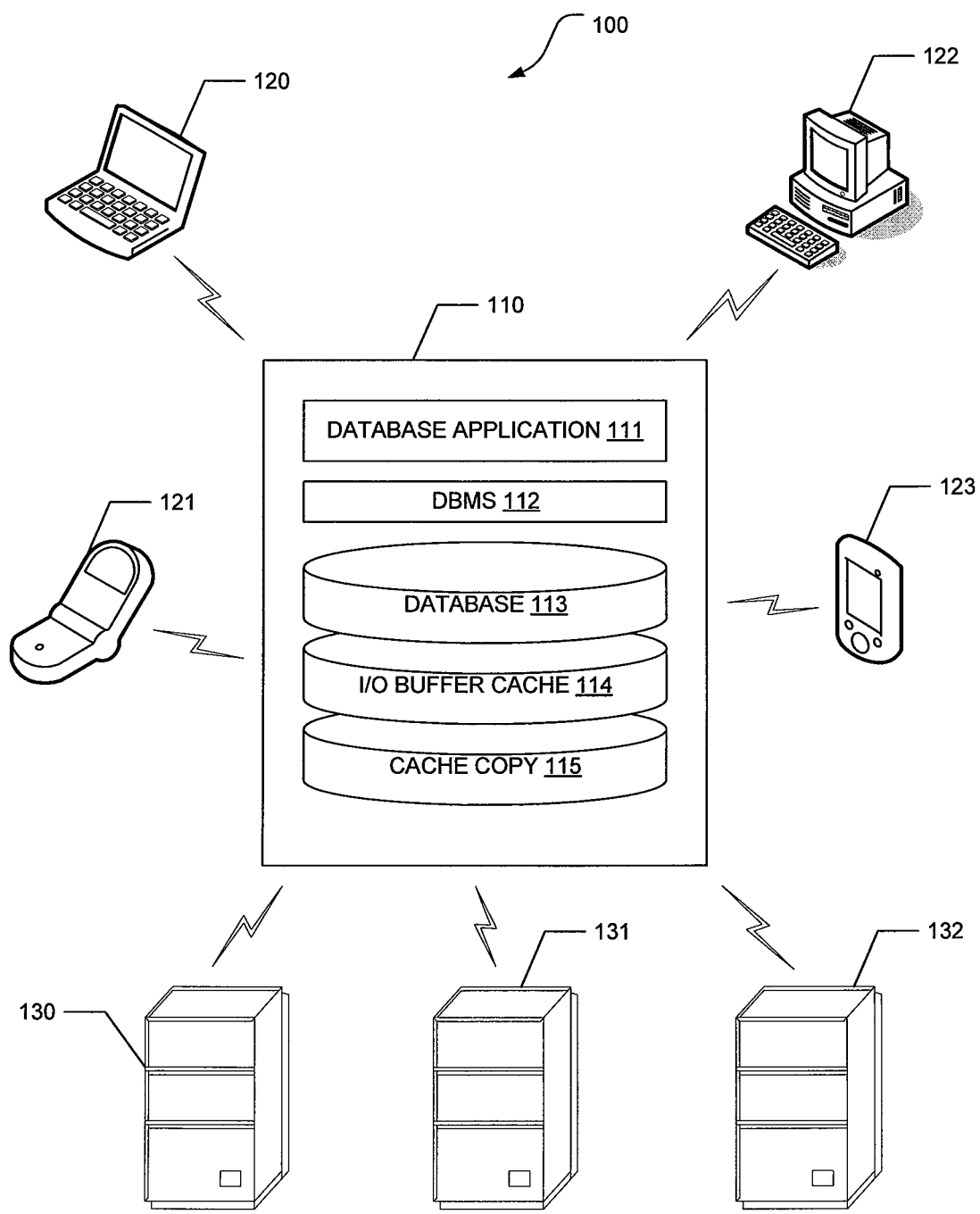
FIG. 1 depicts a block diagram of a system according to an illustrative embodiment.

FIG. 1 depicts a block diagram of a system 100 according to an illustrative embodiment. The system 100 illustrates a client-server database environment including a processing system 110 (e.g., an application/database server), client devices 120-123, and data sources 130-132. Other system topologies may be used in conjunction with other embodiments. The processing system 110 may operate to receive, store, manage, and provide data. Such data may be received from sources such as data sources 130-132 and/or generated by the processing system 110. The data may be provided to client devices 120-123 in response to requests received.

The processing system 110 includes a database application 111, a database management system (DBMS) 112, a database 113, an input/output (I/O) buffer cache 114, and a cache copy 115. The database application 111 may provide order fulfillment, business monitoring, inventory control, online shopping, and/or any other suitable functions by way of interactions with other elements of the processing system 110. According to some embodiments, the database application 111 communicates with DBMS 112 over one or more interfaces provided by the DBMS 112. The database application 111 may, in turn, support client applications executed by client devices 120-123. Such a client application may, for example, include a Web browser to access and display reports generated by the database application 111. In this regard, for example, the processing system 110 may comprise a Web server to manage interactions with the client devices 120-123.

The DBMS 112 may comprise any suitable system for managing a database instance. Generally, the DBMS 112 may receive requests for data (e.g., Structured Query Language (SQL) requests from the database application 111), may retrieve requested data from the database 113, and may return the requested data to a requestor. The DBMS 112 may also perform start-up, logging, recovery, management, optimization, monitoring, and other database-related tasks. It should also be noted that the DBMS 112 may operate to delete a data volume from the database 113 according to some embodiments described herein.

It should be appreciated that the database is an example of a data structure. As used herein, a "data structure" provides context for the organization of data. Examples of data structures include tables, arrays, linked lists, indexes, databases, and other data structures. In particular, a "database" refers to one or more structured sets of persistent data. An example of a database is a single file containing many records, with each record containing the same set of fields where each field has a certain fixed length. In the example of FIG. 1, the database 113 may comprise one or more disparate systems for storing data, and therefore DBMS 122 may comprise one or more systems for retrieving the stored data.

The data stored in the database 113 may include data records and associated index entries (e.g., application data), as well as configuration files, database parameters, paths, user information, and any other suitable information. In some embodiments, the database 113 is an element of an Online Transaction Processing (OLTP) database instance. An OLTP database instance may be suited for processing individual transactions quickly within an environment comprising a large number of users and a large database.

During database execution, various elements of the database are stored in the I/O buffer cache 114, which may a dedicated server tier for the main memory-based temporary storage of volatile shared data. These elements may include recently accessed pages of application data, converter pages, database catalog objects, and/or a log queue. The cache copy 115 comprises a copy of all or a portion of the I/O cache 114 and additionally, for example, may comprise a database instance that facilitates object-oriented manipulation of the copied cache data.

For example, the cache copy 115 may store copies of some or all of the data within instances of object-oriented (e.g., C++) classes. As used herein, such instances may be referred to as "objects," and may be stored persistently in main memory (e.g., random access memory) according to some conventional database systems. In addition, an "object" may also refer to a particular piece of data stored in a data structure. The cache copy 115 is described in further detail below with respect to FIG. 2.

It should be appreciated that the processing system 110 may include other elements that are not shown and may be used during operation thereof, such as any suitable program code, scripts, or other functional data that is executable to interface with other elements of system 100, other applications, other data files, operating system files, and device drivers.

The data sources 130-132 may comprise any suitable sources that provide data to the processing system 110. The data may be pushed to the processing system 110 and/or provided in response to queries received. For example, one or more of data sources 130-132 may comprise a back-end data environment employed in a business or industrial context. The data sources 130-132 may therefore comprise many disparate hardware and software systems, some of which may not operate with one another.

It should be noted that two or more of the elements of system 100 may be located remote from one another and may communicate with one another via a network and/or a dedicated connection. Moreover, each displayed element of system 100 may comprise any number of hardware and/or software elements, some of which are located remote from each other element. The elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over anyone or more transmission protocols that are or become known, such as Asynchronous Transfer Mode (ATM), Internet Protocol (IP), Hypertext Transfer Protocol (HTTP) and Wireless Application Protocol (WAP).

Figure 2:
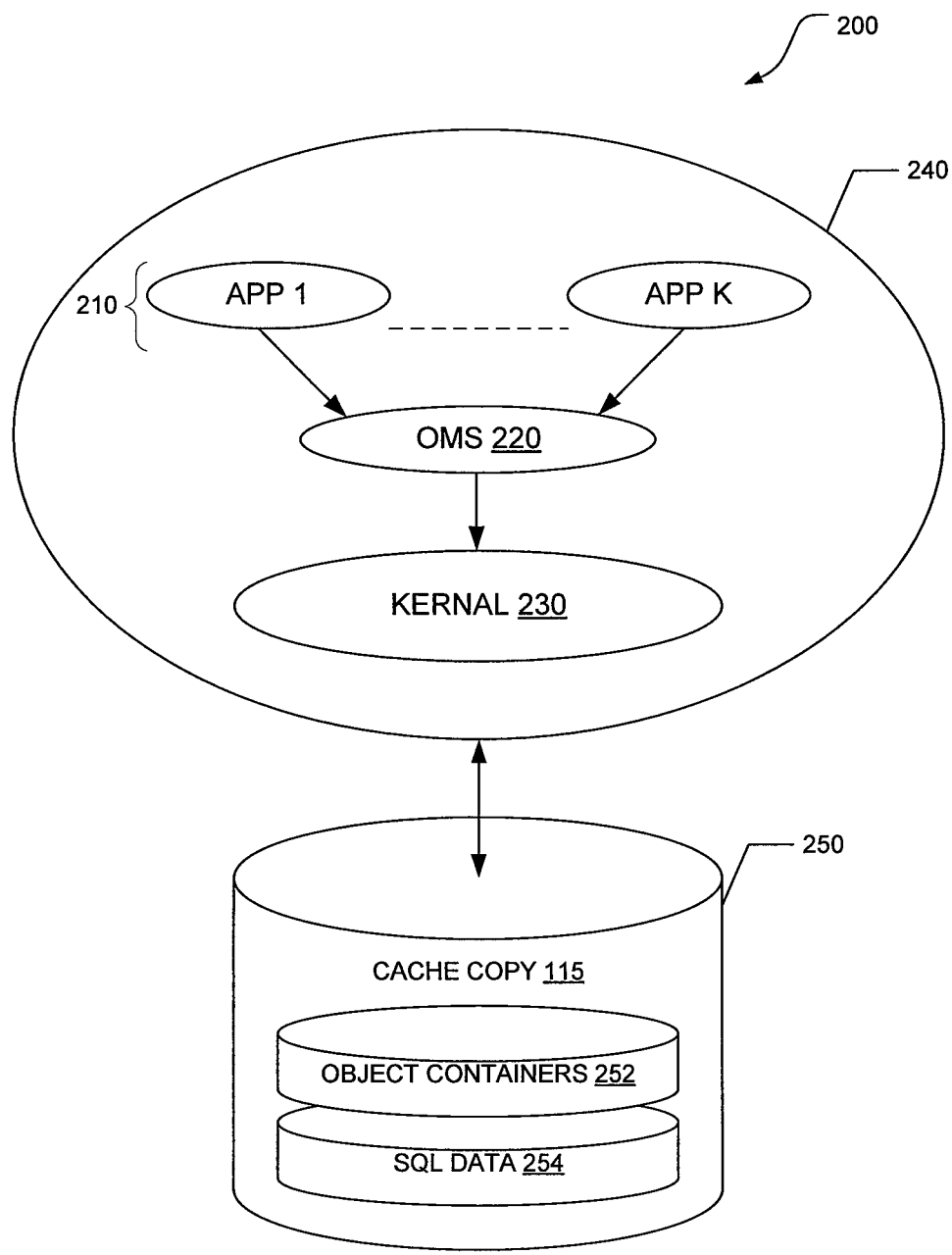
FIG. 2 depicts a diagram illustrating elements of a database instance in which some embodiments may be implemented.

FIG. 2 depicts a diagram illustrating elements of a database instance 200 in which some embodiments may be implemented. The database instance 200 may provide a data cache of persistent objects, as described above. Such objects are managed by an Object Management System (OMS). The OMS may be implemented as an object-oriented library (e.g., libOMS) that is linked to an I/O buffer cache kernel.

Application logic written in object-oriented code is built into application libraries 210 against OMS 220 and kernel 230. The application libraries 210, OMS 220, and kernel 230 may comprise "executable" 240 that executes within a common address space. Executable 240 may comprise an element of the DBMS 112 depicted in FIG. 1, and may comprise any suitable system for managing the database instance 200.

Still referring to FIG. 2, the application libraries 210 contain routines that may be called as database procedures by external work processes. The routines provided by application libraries 210 allow an external work process to create, modify, and delete persistent objects. The OMS 220 operates in conjunction with application libraries 210 to manage the objects and may also perform optimization, monitoring, and other database-related tasks. Furthermore, the OMS 220 may provide application libraries 210 with parallel access to multiple-referenced objects as described herein.

The database 250 may comprise an implementation of the cache copy 115 depicted in FIG. 1. In addition, the database 250 stores objects within class-specific object containers 252. As shown in FIG. 2, the database 250 may also store Structured Query language (SQL) data 254 to be accessed by the executable 240.

Figure 3:
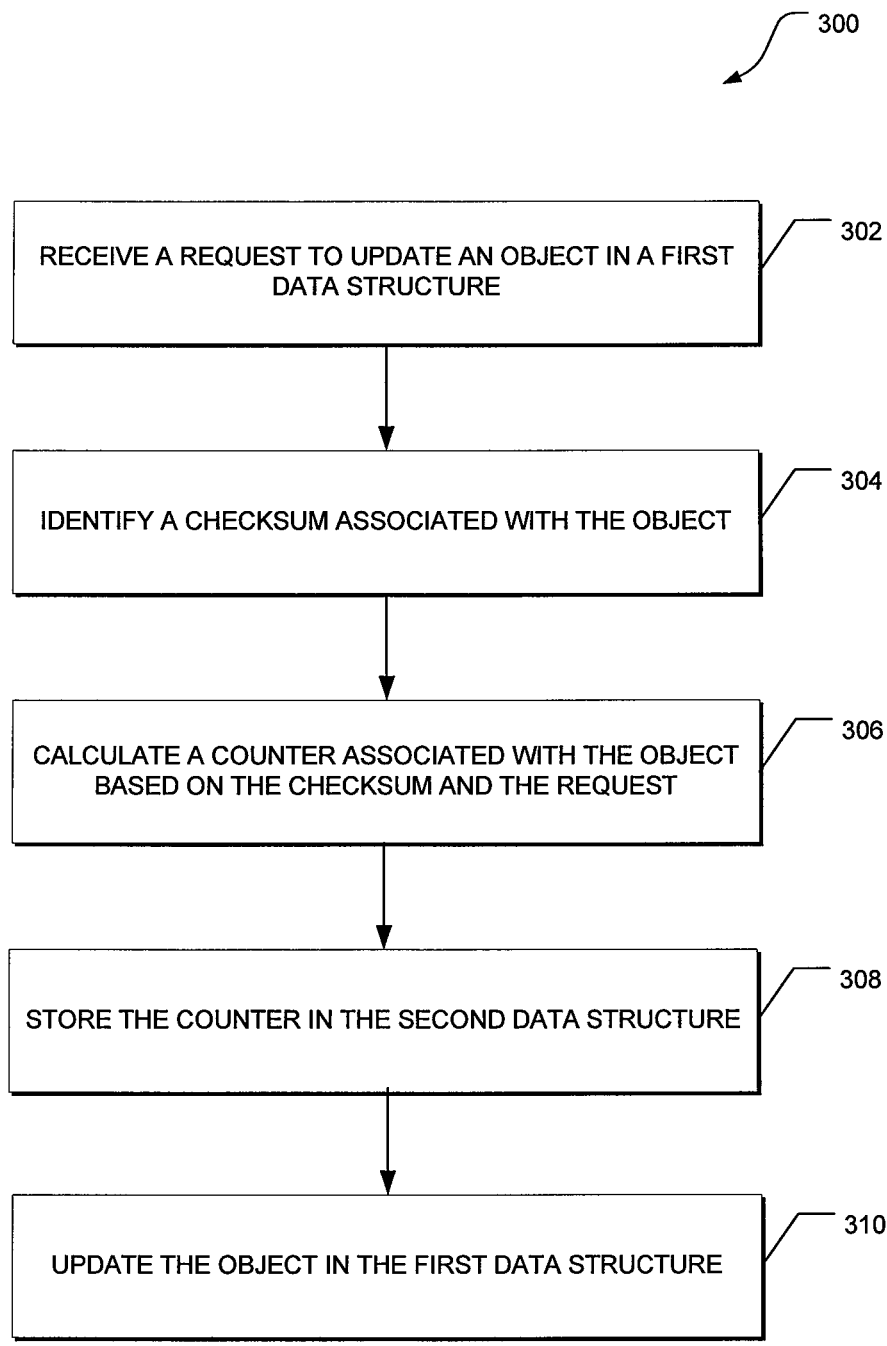
FIG. 3 depicts a flow diagram of a general overview of a method, in accordance with an illustrative embodiment, for monitoring updates involving two data structures.

FIG. 3 depicts a flow diagram of a general overview of a method 300, in accordance with an illustrative embodiment, for monitoring updates involving two data structures. In an embodiment, the method 300 may be implemented by the database management system 112 and employed in the processing system 110 depicted in FIG. 1. In the example of FIG. 3, two data structures, namely a "first" data structure and a "second" data structure, are maintained or provided. The first data structure is configured to store objects and, as explained below, checksums associated with the objects. The second data structure is configured to store information that references the first data structure and, as explained in more detail below, this second data structure is used to identify particular groups of data quickly in the first data structure. It should be noted that in other embodiments, more than one second data structure can be defined in order to allow multiple different ways to access the records in the first data structure.

It should be noted that both the first and second data structures include main keys and may additionally include sub keys. A "main key," as used herein, is a value or set of values in a data structure used to uniquely reference or identify an array or group of records or objects. For example, a main key may be used to reference a group of rows in a table of a relational database, where each individual row stores an individual object. A "sub key," as used herein, is a value or a set of values used to uniquely identify a particular record or object in an array or group of records or objects. As explained in more detail below, the sub key may be used to access the first data structure other than the main key, and provides an alternative identifier for accessing data.

The main key together with the sub key form yet another "total key," which may be a unique identifier of a single record or single object in a database table. Similar to a primary key of a classical database, this total key is a unique identifier that labels or identifies a record, which may be a single field or a group of related fields, such as a particular row in a table of a relational database. That is, this total key can be used to uniquely identify a particular object without reference to any groups of objects. This total key is divided into two keys (a main key and a sub key) to, for example, save space in a database. As an example, a main key combined with a sub key can occupy about 252 bytes of disk space. However, in this example, the main key size is about 40 bytes and the sub key size is about 212 bytes, and each of these keys may be used individually in a database to save space.

As depicted in FIG. 3, a request to update an object in the first data structure is received at 302, and it should be noted that this request is associated with a particular transaction. As used herein, a "transaction" refers to a unit of interaction with a system, such as a database management system. This request may be to delete a particular object from the first data structure or to store the object in the first data structure. It should be appreciated that although the method 300 is described in the context of a single transaction, the method 300 is also applicable to multiple transactions with multiple requests and, in particular, multiple transactions that access the first and second databases in parallel.

After receipt of the request, a checksum associated with the object is identified at 304. A "checksum," as used herein, is a value representing a sum of values. In an embodiment, the checksum is derived from the sub key stored in the first data structure. Here, the sub key is comprised of multiple values (e.g., 234, 33423, and 765) and the checksum is computed from these values based on the application of a checksum algorithm, such as a standard cyclic redundancy check 32 (CRC32) algorithm. In an embodiment, the checksum is stored in the first data structure and may be referenced by a main key and/or a sub key. As such, the identification of the checksum associated with the object includes reading the checksum from the first data structure. In an alternate embodiment, as described in more detail below, the checksum is not stored in the first data structure and is instead calculated or derived directly from a sub key.

A counter associated with the object may then be calculated at 306 and is stored (e.g., by modification or by updates) in the second data structure at 308. A "counter," as used herein, refers to a value that tracks a number or an existence of the object stored in a data structure, such as the first data structure. In effect, as illustrated in more detail below, this counter can be used to monitor updates involving the first and second data structures. The counter may include a variety of numeric values, such as integer values and even decimal values. It should be noted that commutative operations are defined for the update of the counter (e.g., a "+" or "−" operation for integer or decimal counters).

The counter can be calculated based on the checksum and type of request received. In an embodiment, as explained in more detail below, the counter is a sum of the checksums associated with one or more objects. Depending on the type of request received (e.g., deletion or storage), the counter can be increased or decreased based on the checksum. For example, if the request is to store the object in the first data structure, then the counter may be increased based on the checksum. However, if the request is to delete the object from the first data structure, then the counter may be decreased based on the checksum.

The object is further updated at 310 in the first data structure depending on the type of request. For example, the update may include the deletion of the object from the first data structure or the storage of the object in the first data structure.

FIGS. 4a, 4b, and 4c depict diagrams illustrating the monitoring of updates in a database 450 with an index 470, in accordance with an illustrative embodiment, by tracking objects in the form of temporary quantity assignments (TQAs). As depicted in FIG. 4a, a database 450 and an index 470 are maintained or provided for use in, for example, supply chain management, which is used to plan and organize business processes. An assessment of availability, which is also referred to as an availability check, investigates whether and when a promised delivery can be made. When processing an order, the order with required goods, quantities, and desired delivery date may be created and the availability of the goods is checked according to some predefined availability check strategy. Depending on the results of the availability check (e.g., partial confirmation or unacceptable delivery date), the order might be changed, availability of the goods is checked again, or the results are accepted. This order is then stored or canceled. In a parallel environment, where goods may be promised multiple times by concurrent or parallel transactions, TQAs may be used to track quantities that are promised in a transaction during an availability check. Such TQAs are stored in the database 450 such that they are immediately visible to all parallel transactions that read the TQAs.

As depicted in FIG. 4a, the database 450 includes a main key field 451, a sub key field 452, a quantity field 453, a merge counter field 454, and a checksum field 455. In this example, the main key stored in the main key field 451 is a value comprised of a product location identifier and a transaction identifier that uniquely identifies a record or row in the database 450. The transaction identifier uniquely identifies a particular transaction and the product location identifier uniquely identifies a particular product location combination. Accordingly, a row in the database 450 is configured to store all TQAs associated with a particular product location combination and transaction.

The sub key stored in the sub key field 452 is a value that uniquely identifies a particular TQA within a group of TQAs associated with a particular product location combination and transaction. It should be noted that, in this example, multiple groups of TQAs may be stored within the database 450, and the sub key may be used to identify an individual TQA within an individual group. However, it should also be noted that embodiments of the invention can also apply to a classical database table picture, where each TQA is stored in a single row and a total key, which is comprised of another main key plus a sub key, identifies a single row (and thus a single TQA). A quantity stored in the quantity field 453 is a value that identifies an amount of, for example, a good requested by the TQA. The merge counter stored in the merge counter field 454 is a value that identifies a sum or number of identical TQAs. For example, if one particular TQA is stored in the database 450, then the merge counter is one. The merge counter increases to two if another, identical TQA is stored in the same database 450. As such, the merge counter is configured to track a number of a particular type of received TQA. Identical TQAs are merged into the same database record and the quantity 453 is the sum of the quantities of the individual TQA. The checksum, as described above, is stored in the checksum field 455. It should be appreciated that in a database, such as database 450, utilizing a "consistent view," database operations of parallel transactions (e.g., creation or deletion of TQA) might not be immediately visible. Thus, the merge counter allows the counter 473 to be updated in a consistent way even when invisible, parallel transactions perform updates on the same data structures.

In the example of FIG. 4a, a request to store a particular TQA called "TQA 1" is received that identifies a quantity of 15, an association with transaction T1, and a product location at P1. As a result, the TQA 1 is stored in the database 450 at a location identified by a main key of P1/T1. In particular, a sub key assigned to this TQA 1 is S1 and stored in the sub key field 452. The quantity of 15 is stored in the quantity field 453. Here, the merge counter stored in the merge counter field 454 is assigned a value of one because, at this time, only one TQA 1 is stored in the database 450. A checksum value of 409 is derived from the sub key S1 and stored in the checksum field 455.

In order to find all TQAs, such as TQA 1, belonging to a single transaction, such as T1, all product locations have to be searched. Such a search may be time consuming especially with a large number of product locations and transactions. As a result, the index 470 is maintained or provided such that all the TQAs associated with a particular transaction can be quickly located or identified by referencing the index 470. This index 470 is not configured to store the TQAs and, as a result, does not have complete information about each TQA. Instead, the index 470 stores information associated with the main key in the database 450 that references the product locations of the TQAs associated with a particular transaction, which is described in more detail below.

As depicted in FIG. 4a, the index 470 includes a main key field 471, a sub key field 472, and a counter field 473. The main key stored in the main key field 471 uniquely identifies a particular transaction, such as T1, and, in an example, the main key field 471 may store transaction identifiers. The sub key field 472 stores product location identifiers (e.g., product location P1). According to the discussion above, the main key stored in the main key field 471, which may be comprised of fields 472 and 473, may reference a group of records containing a set of product locations for which TQAs have been created during transaction T1. Thus, from the index 470, the main keys for all TQAs belonging to a transaction T1 can be constructed.

The counter stored in the counter field 473, in accordance with an illustrative embodiment, is calculated based on both a checksum, as described above, and the merge counter. That is, the counter may be expressed as:

$$Cnt = \sum_{i \in S} (MergeCounter(i) * Checksum(i)) \qquad 1.0$$

where the counter is a sum of the merge counter multiplied by the checksum. This sum covers all objects i in the set S of TQAs belonging to a combination of, for example, transaction T1 and product location P1. According to Equation 1.0, the counter depicted in FIG. 4a is the sum of the merge counter (value=1) multiplied by the checksum (value=409), which results in a value of 409 that is stored in the counter field 473 associated with transaction T1 of the index 470.

FIG. 4b depicts a diagram illustrating the receipt of another request to store a particular TQA called "TQA 2" that identifies a quantity of 20, an association with transaction T1, and a location at P1. As a result, TQA 2 is stored in the database 450 at a location identified by the same main key of P1/T1. In particular, a sub key assigned to this TQA 2 is S2 and stored in the sub key field 456. The quantity of 20 is stored in the quantity field 457. The merge counter stored in the merge counter field 458 is assigned a value of one because, at this time, only one TQA 2 is stored in the database 450. A checksum value of 103 is derived from the sub key S2 and stored in the checksum field 459.

As a result of the storage of TQA 2, the counter stored in the counter field 473 and associated with the main key T1 and the sub key P1 in the index 470 is modified. According to Equation 1.0, the counter is the sum of the merge counters multiplied by the checksums ((1*409)+(1*103)), which results in a value of 512 that is stored in the counter field 473 of the index 470. In effect, the counter is increased from the last counter value of 409 because the request is to store another TQA, namely TQA 2, associated with transaction T1 in the database 450.

FIG. 4c depicts a diagram illustrating parallel deletions of TQA 2. In this example, two requests are received to delete the same TQA 2 and these requests are made in parallel, for example, by two different customers. As a result of the deletion requests, the merge counter stored in the merge counter field 458 is decreased to a value of −1 because two requests for the deletion of TQA 2 are received, resulting from the subtraction of two from the original merge counter value of one.

According to Equation 1.0, the counter is the sum of the merge counters multiplied by the checksums ((1*409)+(−1*103)), which results in a value of 306 that is stored in the counter field 473 in the index 470. In effect, the counter stored in the counter field 473 is decreased from the last counter value of 512 because the requests are to delete TQAs, namely TQA 2, associated with T1 from the database 450. In this example, this positive counter value of 306 indicates that TQAs associated with transaction T1 still exist in the database 450. However, for example, if the counter has a value of zero, then such a zero counter value may indicate that no TQAs associated with transaction T1 are stored in the database 450. That is, TQAs associated with transaction T1 do not exist in the database. With a value of zero, the record (or row) associated with transaction T1 may therefore be deleted from the index 470. Depending on the type of checksum used to calculate the counter, a variety of other values may also indicate the existence of objects, such as TQAs. For example, in an embodiment, a counter with a value of one may also indicate that no TQAs exist in the database 450.

It should be appreciated that in addition to the transaction identifier, other values can also be used to access the TQAs. For example, an order identifier may be used to access the TQAs. An "order identifier," as used herein, refers to an identifier that uniquely identifies a particular order or a quantity of goods or items purchased or sold. Alternatively, an order position identifier may also be used to access the TQAs. An "order position identifier," as used herein, refers to an identifier that uniquely identifies a position (e.g., a line item) within an order. As an example, in order for a computer may be identified by the order identifier. The computer includes multiple components (e.g., hard disk and central processing unit) and each component can be identified by its order position identifier.

In another embodiment, the main key stored in the main key field 451 of the database 450 can also include a value comprised of the product location identifier and the order identifier. Here, the index 470 can have more than one entry per TQA. For example, the main key field 471 of the index 470 can be configured to store order identifiers and also transaction identifiers. In yet another embodiment, the main key can also be a value comprised of the product location identifier and the order position identifier. Similarly, the main key field 471 of the index 470 can be configured to store order position identifiers and also transaction identifiers.

Figure 5:
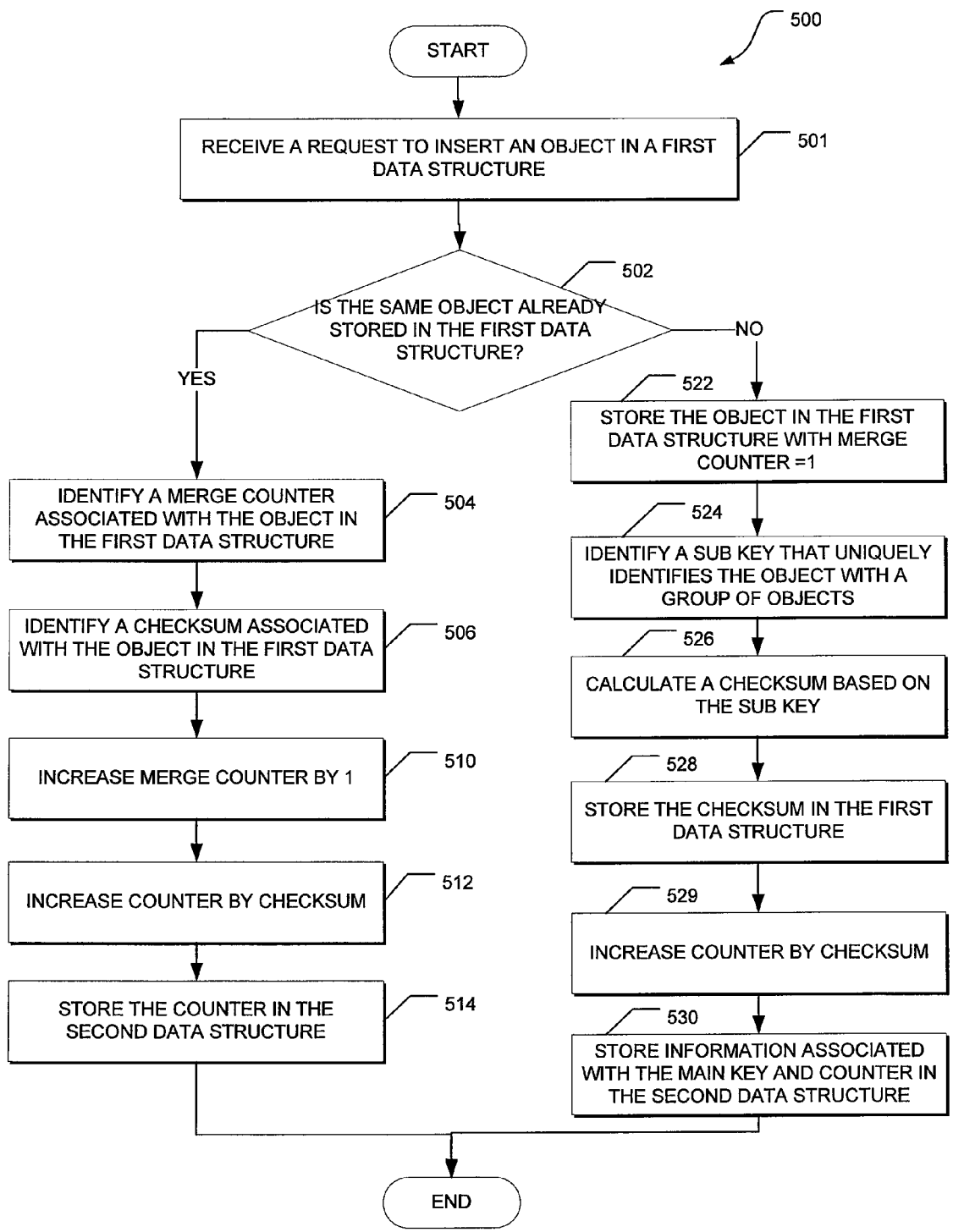
FIG. 5 depicts a flow diagram of a detailed method, in accordance with an illustrative embodiment, of storing an object in a data structure.

FIG. 5 depicts a flow diagram of a detailed method 500, in accordance with an illustrative embodiment, of storing an object in a data structure. In this example, two data structures are provided, namely a "first" data structure and a "second" data structure. The first data structure is configured to store objects while the second data structure is configured to store information that track the existence of the objects in order to monitor updates in the first data structure.

At 501, a request to store an object in the first data structure is received. This request may include information associated with the object that is used to reference or locate the object in the first data structure, such as a main key value that is associated with the object. Identification is then made at 502 whether this object is already stored in the first data structure. If this object is already stored in the first data structure, then a merge counter associated with the object is identified at 504 by, for example, referencing the main key associated with the object.

In an embodiment, with the object located in the first data structure, the checksum associated with the object is also identified at 506 from the first data structure. In an alternate embodiment, this checksum may not be stored in the first data structure, which is explained in more detail below, and may be directly calculated based on a sub key.

With the merge counter identified, this merge counter is increased by a value of one at 510 because only one additional request is stored. The increment is based on a number of received requests to store a particular object and, for example, if three requests to store the same object are received, then the merge counter is increased by three.

For each received request, the counter, according to Equation 1.0, is increased by the checksum at 512. Therefore, as a result of the (parallel) storage of multiple objects, the counter stored in the second data structure at 514 is the sum of the merge counters multiplied by the corresponding checksums.

Referring to 502 depicted in FIG. 5, if the same object is not in the first data structure, then the object is stored in the first data structure at 522 and assigned a merge counter of one, because at this time, only one object is stored in the first data structure. A sub key may then be assigned to the object and this sub key is identified at 524. A checksum may then be calculated at 526 based on the sub key, which is described above, and this calculated checksum is then stored in the first data structure at 528.

A counter, according to Equation 1.0, for example, may then be calculated at 529 by increasing the counter in the second data structure by the checksum. Thereafter, the remaining part of the main key of the first data structure, which is the information associated with the main key, along with the counter are stored in the second data structure at 530.

Figure 6:
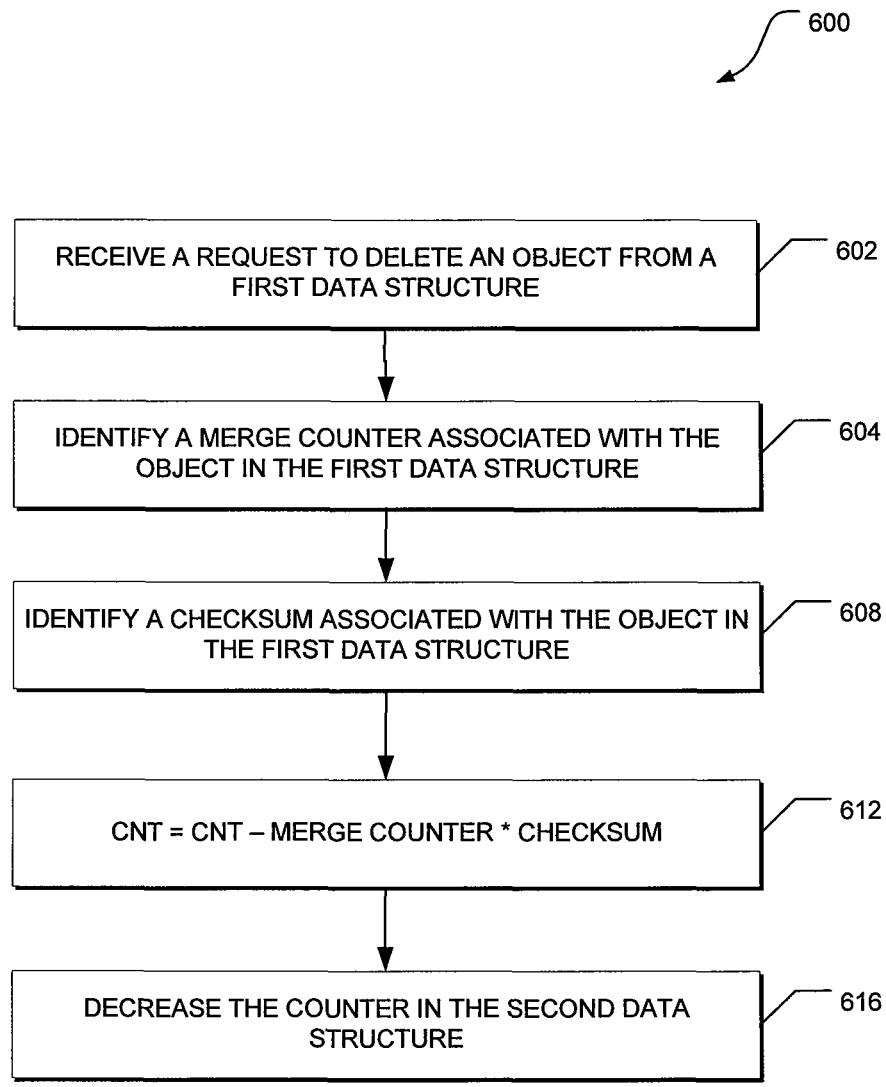
FIG. 6 depicts a flow diagram of a detailed method, in accordance with an illustrative embodiment, for deleting an object from a data structure.

FIG. 6 depicts a flow diagram of a detailed method 600, in accordance with an illustrative embodiment, for deleting an object from a data structure. In this example, two data structures are provided, namely a "first" data structure and a "second" data structure. The first data structure is configured to store objects while the second data structure is configured to store information that track the existence of the objects in order to monitor updates in the first data structure.

Here, a request to delete an object from the first data structure is received at 602. This request may include information associated with the object, such as a main key value that is associated with the object and an amount of the object, that is used to reference or locate the object in the first data structure.

The merge counter associated with the object is identified from the first data structure at 604 and additionally, in an embodiment, a checksum associated with the object is identified in the first data structure at 608. Again, as discussed in more detail below, according to another embodiment, this checksum may not be stored in this first data structure.

A counter, according to Equation 1.0, for example, may then be calculated at 612 by subtracting a product of the checksum and the merge counter from the counter. It should be noted that a merged object can be deleted when a subtraction of the merge counter from the amount results in a zero value. The counter in the second data structure is then decreased at 616 by the calculated counter value.

Figure 7:
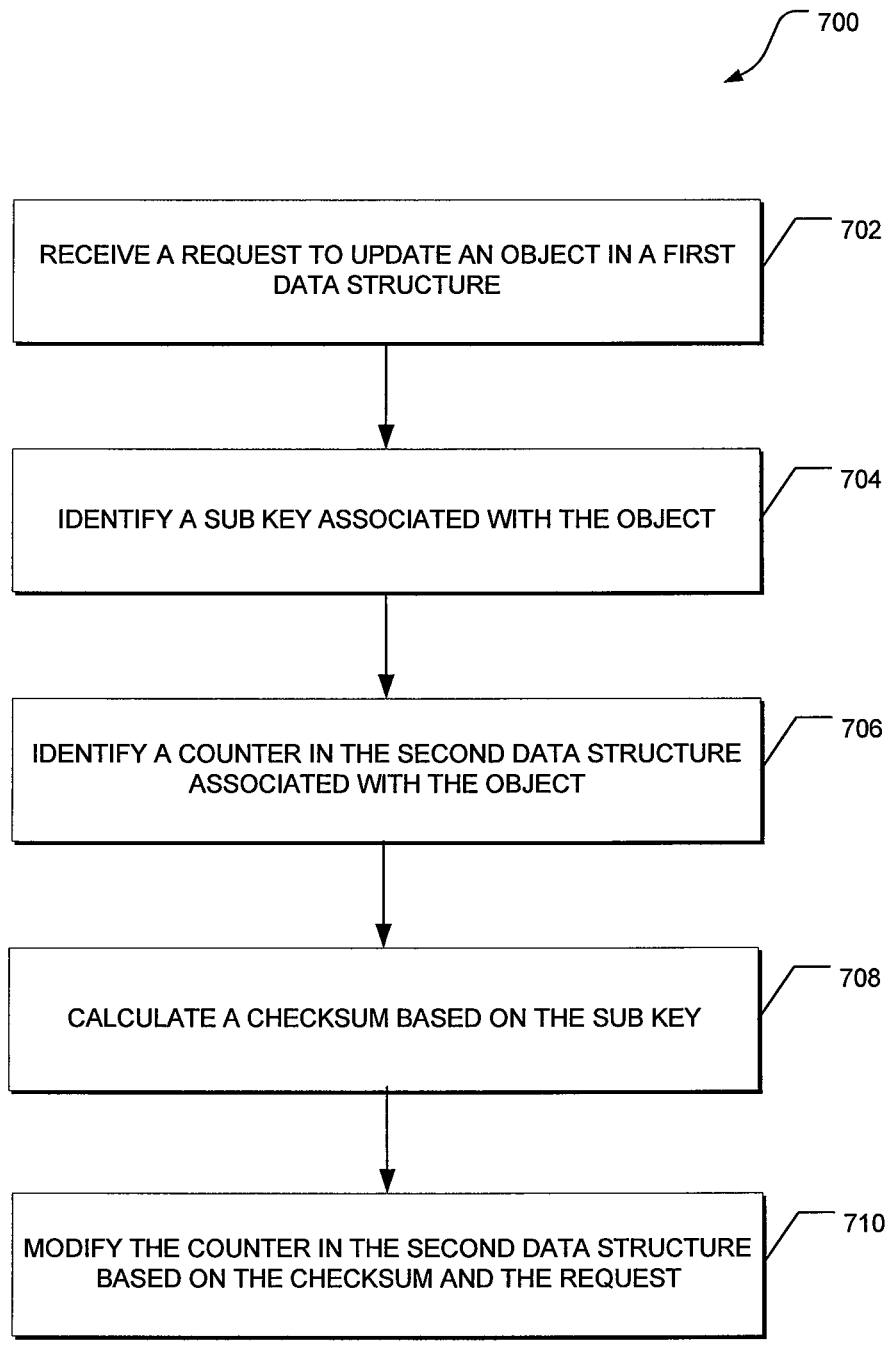
FIG. 7 depicts a flow diagram of a general overview of a method, in accordance with an alternative embodiment, for monitoring updates involving two data structures.

FIG. 7 depicts a flow diagram of a general overview of a method 700, in accordance with an alternative embodiment, for monitoring updates involving two data structures. In an embodiment, the method 300 may be implemented by the database management system 112 and employed in the processing system 110 depicted in FIG. 1. In the example of FIG. 7, two data structures, namely a "first" data structure and a "second" data structure, are again maintained or provided. The first data structure is configured to store objects while the second data structure is configured to store information that track the existence of the objects in order to monitor updates in the first data structure.

Initially, a request to update an object in the first data structure is received at 702, and this request is associated with a particular transaction. It should be appreciated that although the method 700 is described in the context of a single transaction, the method 700 is also applicable to multiple transactions with multiple requests and, in particular, multiple transactions that access the first and second databases in parallel.

After receipt of the request, a sub key associated with the object is identified in the first data structure at 704. Additionally, a counter associated with the object is identified in the second data structure at 706. This identified counter is the last recorded counter value and, as described in more detail below, may be modified based on the checksum and the request.

The checksum is then calculated based on the sub key in the first data structure at 708 and, in an alternate embodiment, the counter previously identified from the second data structure is modified at 710 based on the calculated checksum. The modification may include increasing the counter based on the checksum. For example, the calculated checksum can be added to the last recorded counter value to increase the counter's value. The modification may also include decreasing the counter based on the checksum. Here, for example, the calculated checksum may be subtracted from the last recorded counter value to decrease the counter's value.

It should be noted that the checksum is actually a distinct type of a family of hash functions. In effect, the checksum is calculated based on an application of a particular hash function to the sub key. As a result, in an alternate embodiment, the counter can be calculated based on a hash function of the sub key. In addition to the counter described in Equation 1.0 above, the counter may also be expressed as:

$$Cnt = \Sigma_{i \in S}(\text{Merge Counter} * (1 + h(i)^2)) \qquad 2.0$$

where the sum covers all objects i in the set S of objects belonging to, for example, a combination of transaction T1 and product location P1 with h(i) being the hash value for the $i^{th}$ object. A value of one is added in Equation 2.0 in order to avoid a zero checksum and therefore, in this embodiment, a counter value of zero identifies the nonexistence of an object in the first data structure. A variety of other hash functions may be used, such as a cyclic redundancy check (CRC) function (a type of checksum algorithm) or other standard hash algorithms that map items (e.g., values of a key) to integer keys.

In addition to the counters described above, the counters may also be calculated based on other techniques. For example, in another embodiment, the counter may be in the form of a single integer counter. Here, a certain integer value may correspond to one or more values (or items) of a key. If a value of the key is added to a set of values, the counter is increased by this value. On the other hand, if the value is removed from the set of values, the counter is decreased by this value. To determine the integer contribution from a single value into the counter, an assumption can be made that that "k" transactions may run in parallel and keys are comprised of integers within the range $[1, N_{Max}]$. To be unique, the contribution from each key "n" is to exceed total contributions from all keys smaller than 'n':

1: 1
2: k+1
3: $k+k(k+1)+1=(k+1)^2$
...
n: $(k+1)^{n-1}$

As such, after inserting (or removing) a value with key "n" into the set, the counter is increased (or decreased) by $(k+1)^{n-1}$. The total counter values can then be expressed as:

$$Cnt = \sum_{n=1}^{N_{max}} c(n)(k+1)^{n-1} \qquad 3.0$$

where c(n) is the number of values with key "n" in the set ($0 <= c(n) <= n$). It should be noted that in the example where $k=2^8-1$, the counter expressed in Equation 3.0 is equivalent to a counter with an array of single byte integers.

In yet another embodiment, the counter may be in the form of a multiplicative counter for an arbitrary concurrency rate. Instead of hash value, a primary number pn(i) can be used as $i^{th}$ key. Insertion or deletion of the value (or item) in a set equates to the multiplication or division of the counter by this primary number. The counter can be expressed as:

$$Cnt = \begin{cases} \prod_{i \in S(\neq \emptyset)} pn(i) \\ 1, \quad \text{if } S = \emptyset, \end{cases} \qquad 4.0$$

Figure 8:
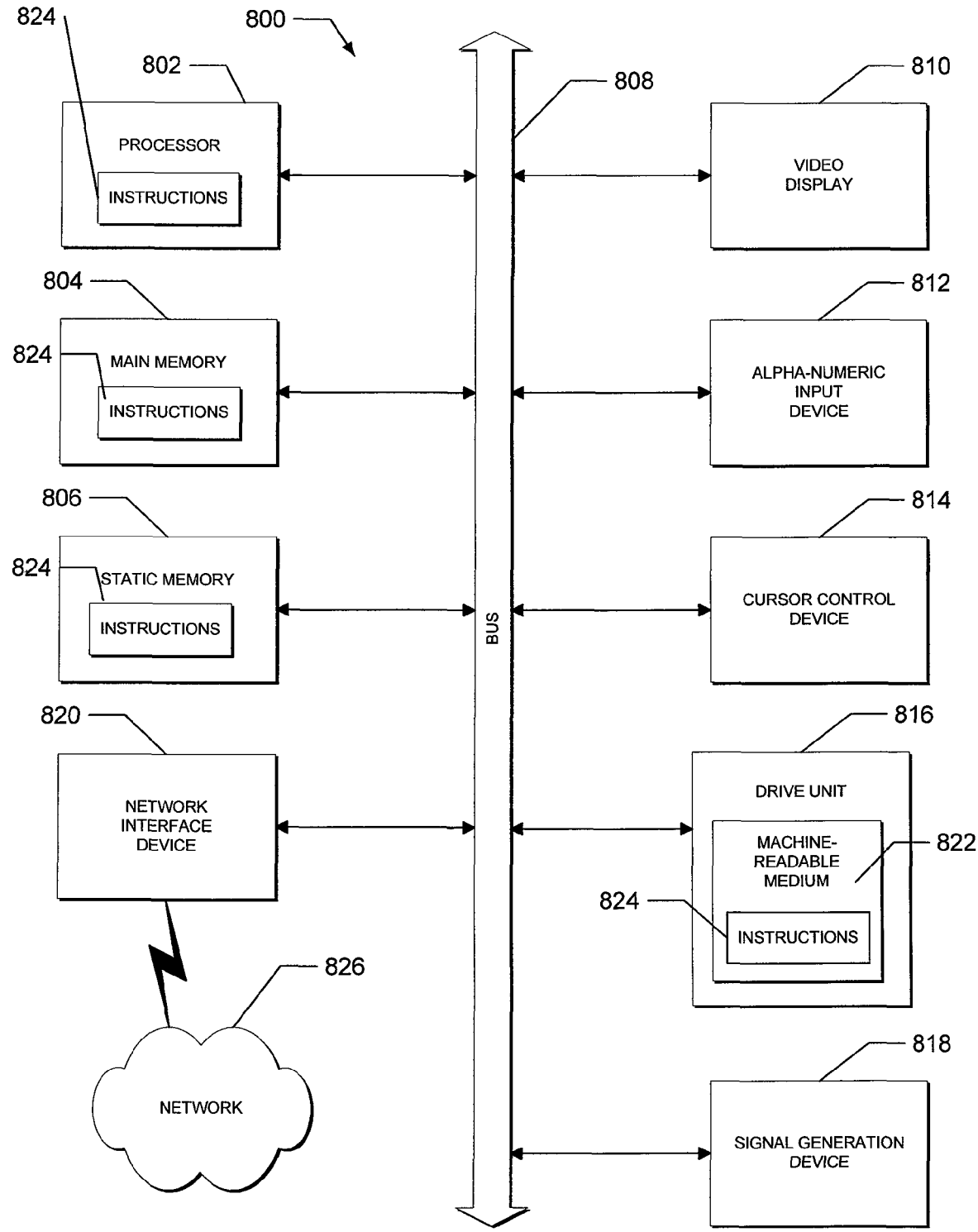
FIG. 8 is a block diagram of a machine in the example form of a processing system within which a set of instructions, for causing the machine to perform any one or more of the methodologies discussed herein, may be executed.

The counter as expressed in Equation 4.0 equals one if the set is empty (e.g., object does not exist in the first data structure). Different contributions into Equation 4.0 are independent and, as such, an inverse function can be built. For example, a pseudo code to calculate number of values in the set characterized by the main key "pn" may be expressed as:

c=0, Cnt2=Cnt;

while ($Cnt2=Cnt2/pn$:int.part$\neq$0&frac.part=0)c=c+1;

FIG. 8 is a block diagram of a machine in the example form of a processing system within which a set of instructions, for causing the machine to perform any one or more of the methodologies discussed herein, may be executed. In some embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. In a networked deployment, the machine may operate in the capacity of a server or a client machine in server-client network environment, or as a peer machine in a peer-to-peer (or distributed) network environment.

Embodiments may also, for example, be deployed by Software-as-a-Service (SaaS), Application Service Provider (ASP), or utility computing providers, in addition to being sold or licensed via traditional channels. The machine may be a server computer, a personal computer (PC), a tablet PC, a set-top box (STB), a Personal Digital Assistant (PDA), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example processing system 800 includes processor 802 (e.g., a central processing unit (CPU), a graphics processing unit (GPU) or both), main memory 804 and static memory 806, which communicate with each other via bus 808. The processing system 800 may further include video display unit 810 (e.g., a plasma display, a liquid crystal display (LCD) or a cathode ray tube (CRT)). The processing system 800 also includes alphanumeric input device 812 (e.g., a keyboard), user interface (UI) navigation device 814 (e.g., a mouse), disk drive unit 816, signal generation device 818 (e.g., a speaker), and network interface device 820.

The disk drive unit 816 includes machine-readable medium 822 on which is stored one or more sets of instructions and data structures (e.g., software 824) embodying or utilized by any one or more of the methodologies or functions described herein. The software 824 may also reside, completely or at least partially, within main memory 804 and/or within processor 802 during execution thereof by processing system 800, main memory 804 and processor 802 also constituting machine-readable, tangible media.

The software 824 may further be transmitted or received over network 826 via network interface device 820 utilizing any one of a number of well-known transfer protocols (e.g., HTTP).

While machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is (are) described with reference to various implementations and exploitations, it will be understood that these embodiments are illustrative and that the scope of the invention(s) is not limited to them. In general, techniques for monitoring updates involving data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method of monitoring updates involving a first data structure and a second data structure that are configured to be accessed in a plurality of parallel transactions, the method comprising:
   receiving a request to update an object in the first data structure;
   identifying a checksum that is associated with the object, the checksum being derived from a sub key in the first data structure that uniquely identifies the object within a group of a plurality of objects;
   calculating, using one or more processors of a machine, a counter associated with the object, based on the checksum and the request, the counter being increased by the checksum based on the request being a request to store the object in the first data structure, the counter being decreased by the checksum based on the request being a request to delete the object from the first data structure, the counter configured to track an existence of the object in the first data structure; and
   storing the counter in the second data structure.

2. The method of claim 1, wherein the first data structure includes a main key that uniquely identifies the group of the plurality of objects in the first data structure, includes the sub key that uniquely identifies the object within the group of the plurality of objects, and includes the checksum, and wherein the second data structure includes information associated with the main key and further includes the counter associated with the object.

3. The method of claim 1, further comprising updating the object in the first data structure.

4. The method of claim 1, wherein the checksum is stored in the first data structure and wherein the identifying of the checksum comprises reading the checksum from the first data structure.

5. The method of claim 1, wherein the identifying of the checksum comprises calculating the checksum based on the sub key.

6. The method of claim 1, wherein the counter tracks an existence of the plurality of objects in the first data structure.

7. The method of claim 1, wherein the first data structure includes a main key that uniquely identifies the group of the plurality of objects in the first data structure, includes plural sub keys that uniquely identify each object within the group of the plurality of objects, and includes plural checksums corresponding to the plurality of objects, and
   wherein the second data structure includes information associated with the main key and further includes a counter associated with the plurality of objects that tracks an existence of the plurality of objects.

8. A non-transitory computer-readable storage medium including instructions that, when executed by at least one processor of a machine, cause the machine to perform operations comprising:
   receiving a request to update an object in a first data structure;
   identifying a checksum that is associated with the object, the checksum being derived from a sub key in the first data structure that uniquely identifies the object within a group of a plurality of objects;
   calculating a counter associated with the object, based on the checksum and the request, the counter being increased by the checksum based on the request being a request to store the object in the first data structure, the counter being decreased by the checksum based on the request being a request to delete the object from the first data structure, the counter configured to track an existence of the object in the first data structure; and
   storing the counter in a second data structure.

9. A system comprising: comprising:
   at least one hardware processor; and
   memory comprising instructions that, when executed by the at least one hardware processor, cause the system to perform operations comprising:
   receiving a request to update an object in a first data structure;
   identifying a checksum that is associated with the object, the checksum being derived from a sub key in the first data structure that uniquely identifies the object within a group of a plurality of objects;
   calculating a counter associated with the object, based on the checksum and the request, the counter being increased by the checksum based on the request being a request to store the object in the first data structure, the counter being decreased by the checksum based on the request being a request to delete the object from the first data structure, the counter configured to track an existence of the object in the first data structure; and
   storing the counter in a second data structure.

* * * * *